USOO5542016A

United States Patent [19]
Kaschke

[11] Patent Number: 5,542,016
[45] Date of Patent: Jul. 30, 1996

[54] OPTICAL FIBER LIGHT EMITTING APPARATUS

[75] Inventor: Kevin D. Kaschke, Hoffman Estates, Ill.

[73] Assignee: Motorola, Inc., Schaumburg, Ill.

[21] Appl. No.: 374,385

[22] Filed: Jan. 13, 1995

Related U.S. Application Data

[63] Continuation of Ser. No. 57,394, May 5, 1993, abandoned.

[51] Int. Cl.$^6$ .................................................. G02B 6/02
[52] U.S. Cl. ............................ 385/123; 385/31; 385/901; 362/32
[58] Field of Search ................................. 385/123, 115, 385/116, 117, 120, 147, 901; 362/32

[56] References Cited

U.S. PATENT DOCUMENTS

| | | | |
|---|---|---|---|
| 4,761,047 | 8/1988 | Mori | 385/901 |
| 4,885,663 | 12/1989 | Parker | 362/32 |
| 4,907,132 | 3/1990 | Parker | 362/32 |
| 4,997,259 | 3/1991 | Ichimura et al. | 385/115 |
| 5,013,128 | 5/1991 | Stern et al. | 385/123 |
| 5,187,765 | 2/1993 | Muehlemann et al. | 385/115 |
| 5,226,105 | 7/1993 | Myers | 385/147 |

OTHER PUBLICATIONS

Peter Harold, "Membrane Keyboards with Fiber Optics Provide Simple, Low–Voltage Backlighting", EDN, Sep. 5, 1985, pp. 91–92.

*Primary Examiner*—John D. Lee
*Assistant Examiner*—Phan T. H. Palmer
*Attorney, Agent, or Firm*—Kevin D. Kaschke

[57] ABSTRACT

An optical fiber light emitting apparatus (200) comprises at least one optical fiber (201) arranged in a repeating, recurrent pattern extending substantially throughout a predetermined area (206). The optical fiber (201) has a plurality of locations along the length thereof permitting light entering at least one end of the optical fiber (201) for transmission therein to be selectively emitted by the optical fiber (201) at the plurality of locations (210) for producing substantially uniform illumination substantially throughout the predetermined area (206). The repeating, recurrent pattern may form a spiral or serpentine pattern, for example. The repeating, recurrent pattern eliminates the space required for the fan-in arrangement (115) of prior art optical fiber light emitting panels (100). The optical fiber light emitting apparatus (200) is beneficial for illuminating keypads (613) and displays (611) in electronic devices (600), such as portable radio telephones, having limited space available.

28 Claims, 6 Drawing Sheets

OPTICAL FIBER LIGHT EMITTING APPARATUS

This is a continuation of U.S. patent application Ser. No. 08/057,394, filed May 5, 1993 and now abandoned.

FIELD OF THE INVENTION

The present invention relates generally to light emitting apparatus and more particularly to optical fiber light emitting apparatus.

BACKGROUND OF THE INVENTION

It is generally known to form optical fibers into a panel or the like and make the panel luminous in one or more selected areas by altering the total internal reflection character of the optical fibers in such areas. Illumination in these areas is caused by allowing light transmitted into the optical fibers from a remote light source to emerge from the optical fibers in the selected areas.

Normally the light entering one end of an optical fiber passes out the other end thereof after a certain amount of loss takes place. However, if the surface of the optical fiber is disrupted as by scratching or otherwise deformed as by bending the optical fiber at a plurality of discrete locations along its length such that the angle of bend approximately exceeds the angle of-internal reflection light will be emitted at these locations.

Figure 1:
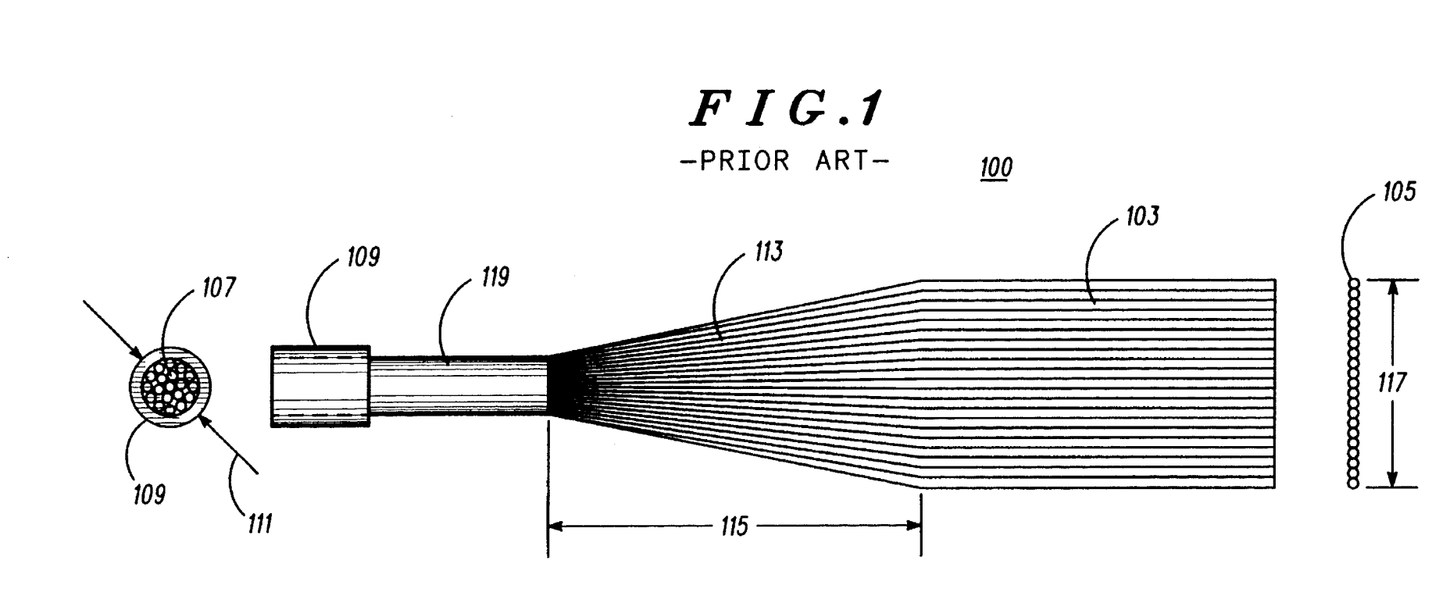
FIG. 1 illustrates a top and end view of a prior art optical fiber light emitting panel.

A conventional optical fiber light emitting panel 100 is shown in FIG. 1. The panel is formed of a plurality of cladded optical fibers arranged in an abutting side-by-side essentially parallel relationship and extending over a predetermined area 103. The distal ends 105 of the optical fibers are typically cut and polished. The proximal ends 107 of the optical fibers are bundled together with a band 109 such that a single light source may be used to illuminate the panel. The diameter 111 of the bundle increases with the number and diameter of the individual optical fibers. The gradual gathering of the optical fibers from their essentially parallel relationship to a bundle produces a fan-in arrangement 113. Typically, the length of the fan-in arrangement 115 is one and one-half times the distance across the essentially parallel optical fibers 117. The optical fibers may optionally be bundled into a cable 119 for routing to a remote location.

A problem with the conventionally formed optical fiber light emitting panel 100 is the space consumed by the fan-in arrangement 115. Although optical fiber light emitting panels provide certain advantages over other lighting apparatus, some lighting applications, such as portable electronics, simply cannot use the conventional optical light emitting panel because of the amount of space available for the fan-in arrangement.

Therefore, there is a need for an improved optical fiber light emitting panel providing essentially the same advantages as the conventional optical fiber light emitting panel but consuming less space.

DETAILED DESCRIPTION OF THE PREFERRED EMBODIMENTS

Generally, the present invention provides an optical fiber light emitting apparatus comprising at least one optical fiber arranged in a repeating, recurrent pattern extending substantially throughout a predetermined area. The optical fiber has a plurality of locations along the length thereof permitting light entering at least one end of the optical fiber for transmission therein to be selectively emitted by the optical fiber at the plurality of locations for producing substantially uniform illumination substantially throughout the predetermined area. The repeating, recurrent pattern may form a spiral or serpentine pattern, for example. The optical fiber light emitting apparatus is advantageously used to illuminate keypads and displays, for example, within electronic devices having limited space available.

Figure 2:
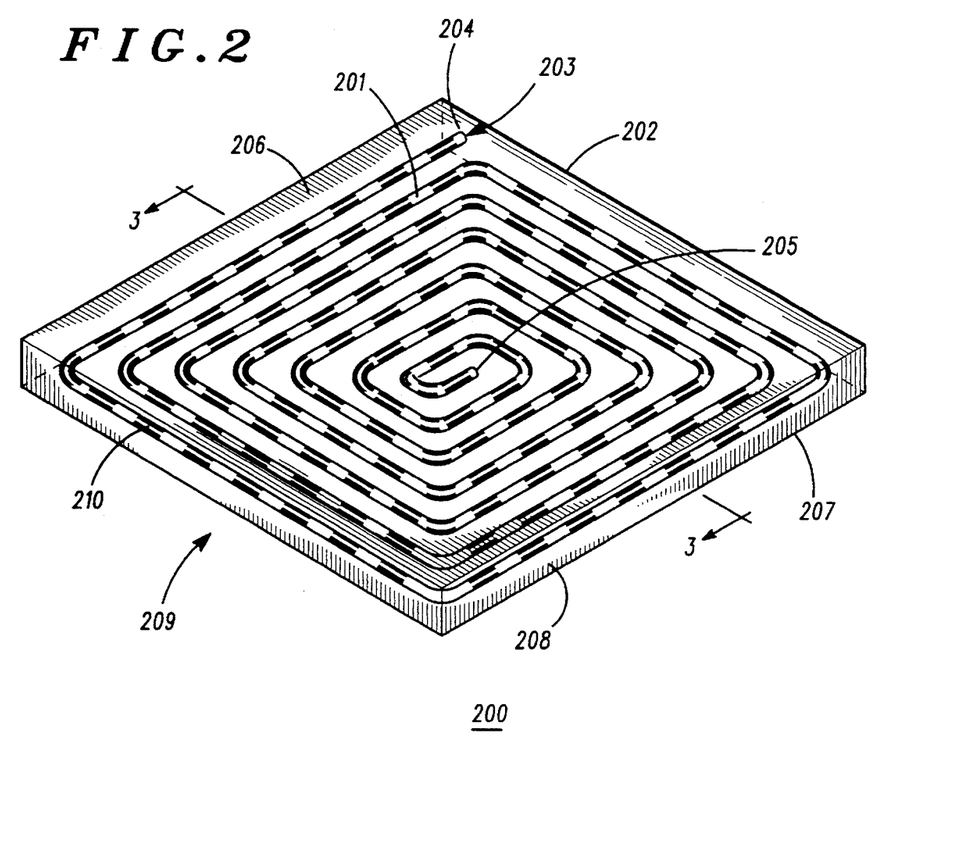
FIG. 2 illustrates a top perspective view of an optical fiber light emitting apparatus including an optical fiber in accordance with the present invention.

The present invention can be more fully understood with reference to FIGS. 2–12 wherein FIG. 2 illustrates a top perspective view of an optical fiber light emitting apparatus 200 including an optical fiber 201 in accordance with a preferred embodiment of the present invention.

In accordance with the present invention, the optical fiber light emitting apparatus 200 comprises at least one optical fiber 201 arranged in a repeating, recurrent pattern extending substantially throughout a predetermined area 206. The optical fiber 201 has a plurality of locations 210 along the length thereof permitting light entering at least a first end 204 of the optical fiber 201 for transmission therein to be selectively emitted by the optical fiber 201 at the plurality of locations 210 for producing substantially uniform illumination substantially throughout the predetermined area 206.

The repeating, recurrent pattern is preferably a spiral pattern 209 but may also be serpentine pattern or even a random pattern if so desired. The pitch between portions of the optical fiber 201 may be tight or loose as desired. The pattern is repeating in that the pattern occurs more than once. The pattern is recurrent in that it turns back in a direction opposite to a former course.

The optical fiber 201 has the first end 204 and a second end 205. A light source 203 transmits the light into the first end 204 of the optical fiber 201. The light source 203 may be remotely located from the optical fiber light emitting apparatus 200 and may supply light for one or more optical fiber light emitting apparatus 200. A light source 203, remotely located, may advantageously be used in dangerous, inaccessible locations or where electricity, heat, EMI or RFI are problems. An optional filter (not shown) may be used to filter the light emitted by the light source 203 before it enters the optical fiber 201. The kind of light source 203 utilized may include light emitting diodes, incandescent bulbs (preferably, for example, T 1 ¼, 5 V/115 mA), arc lamps or even the sun, as is well known in the art.

The second end 205 of the optical fiber 201 is desirably cut and polished and a reflector (not shown) is provided at the second end 205 to reflect light back into the optical fiber 201 thereby increasing its light emitting efficiency, as is well known in the art.

In accordance with the present invention, a carrier 202 forms a support for holding the at least one optical fiber in the repeating, recurrent pattern. The carrier 202 has a top side 206, thereby defining the predetermined area, essentially opposite a bottom side 207 and a lateral side 208 disposed essentially therebetween.

Individually, the optical fiber 201, the carrier 202 and the light source 203 are well known in the art and only a brief description will be presented to facilitate the understanding of the present invention.

The optical fiber 201 is preferably made of a plastic material but any suitable light transmitting material such as glass may be used. The optical fiber 201 is available in diameters ranging from 0.25 mm to 2.0 mm, typically. The optical fiber 201 is durable but should not be bent less than approximately five times its diameter to maintain structural integrity and approximately ten times its diameter to maintain its internal reflection properties at the bend, if desirable.

Several techniques for causing the light to be illuminated from the plurality of locations 210 are well known in the art and only a brief description will be presented to facilitate the understanding of the present invention. One technique used to cause the light to be emitted from the plurality of locations 210 involves disrupting the external surface of the optical fiber 201 by bending (weaving, for example) a plurality of optical fiber strands 500 (see FIG. 5) at a plurality of discrete locations along their lengths such that the angle of each bend approximately exceeds the angle of internal reflection so that a portion of the light will be emitted at each bend. Another technique is used to cause the light to be emitted from the plurality of locations 210 involves varying the lengths of the plurality of optical fiber strands 500 (see FIG. 5) so that a portion of the light will be emitted at the end faces of each optical fiber strand 500. Yet another technique, the preferred, used to cause the light to be emitted from the plurality of locations 210 involves scratching, abrading or chemically removing portions of cladding on the surface of the optical fiber 201 or by doping the internal structure of the core of the optical fiber 201 to cause the light to be deflected out through the cladding of the individual fibers without any deformation of the optical fiber 201 itself.

It is advantageous to increase the frequency of plurality of locations 210 as the distance from the first end 204 of the optical fiber 201 increases to permit light emitted from the plurality of locations 210 to be substantially uniform over the length of the optical fiber 201 and therefor over the predetermined area 206. Several techniques for varying the frequency of light to be illuminated along the length of the optical fiber 201 are well known in the art and only a brief description will be presented to facilitate the understanding of the present invention. One technique for varying the frequency of light to be illuminated along the length of the optical fiber 201 involves varying the shape of the optical fiber disruptions or bends as by varying the tightness of the weave or by varying the proportion of optical fiber strands 500 (see FIG. 5) to other material in the weave. Another technique for varying the frequency of light to be illuminated along the length of the optical fiber 201 involves decreasing spacing between the plurality of locations 210 having the cladding removed from the surface of the optical fiber 201. Still another technique for varying the frequency of light to be illuminated along the length of the optical fiber 201 involves decreasing spacing between various lengths of the optical fiber strands 500 (see FIG. 5).

In accordance with the present invention, the carrier 202 may be fabricated such that it is rigid, flexible, porous or solid and such that it is integrally formed with or separately formed from the optical fiber 201. For example the carrier may be cast, sprayed or injection molded over the optical fiber 201. The carrier 202 may be formed as a substantially translucent acrylic light pipe, an elastomeric keypad, a membrane keypad and a, preferred, resin or epoxy-coated film that is heat or radiation cured upon assembly. It should also be understood that the optical fiber light emitting apparatus 200 can be made to emit light from one or both sides of the carrier 202. The optical fiber light emitting apparatus 200 can also be made in any size or shape. More than one layer of the optical fiber light emitting apparatus 200 may be used to increase the light output over the predetermined area 206.

Figure 3:
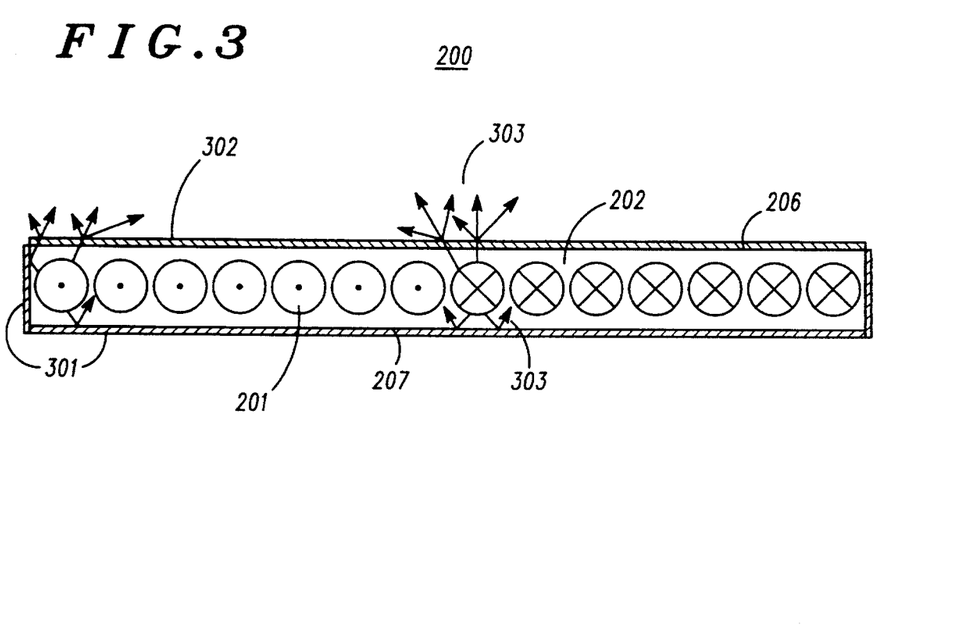
FIG. 3 illustrates a cross-sectional view of the optical fiber light emitting apparatus of FIG. 2 in accordance with the present invention.

FIG. 3 illustrates a cross-sectional view of the optical fiber light emitting apparatus 200 of FIG. 2 in accordance with the preferred embodiment of the present invention. The optical fiber 201 having a dot inside its cross-sectional view represents the optical fiber 201 coming out of the page and a cross inside its cross-sectional view represents the optical fiber 201 going into the page. The optical fiber light emitting apparatus 200 is shown as constructed with an optional, but preferred, reflector 301 and an optional diffuser 302. Individually, the reflector 301 and the diffuser 302 are well known in the art and only a brief description will be presented to facilitate the understanding of the present invention.

The reflector 301 causes at least a portion of the light 303 emitted by the plurality of locations 210 (see FIG. 2) towards the bottom side 207 to be redirected towards the top side 206. Examples of reflectors include inter alia metal foil and white sheets of material disposed adjacent to the bottom side 207, white paint disposed on the bottom side 207 and a textured surface integrally molded into the bottom side 207. The reflector 301 advantageously increases the efficiency of the optical fiber light emitting apparatus 200 by increasing the amount of light 303 emitted from the top side 206. The reflector 301 may also be used to aid in providing a uniform light output from the optical fiber light emitting apparatus 200 by varying the amount of reflection at each of the plurality of locations 210. For example, as the light output from the plurality of locations 210 of the optical fiber 201 decreases, the amount of reflection can increase to compensate thereby providing a uniform light output.

The diffuser 302 is formed of a substantially translucent material for diffusing or scattering at least a portion of the light 303 emitted by the selective areas. Examples of diffusers include inter alia ground glass, smoked/etched plastic and diffuser films. The diffuser 302 advantageously disperses the light 303 emitted from the plurality of locations 210 to further provide uniform lighting over the top side 206.

Figure 4:
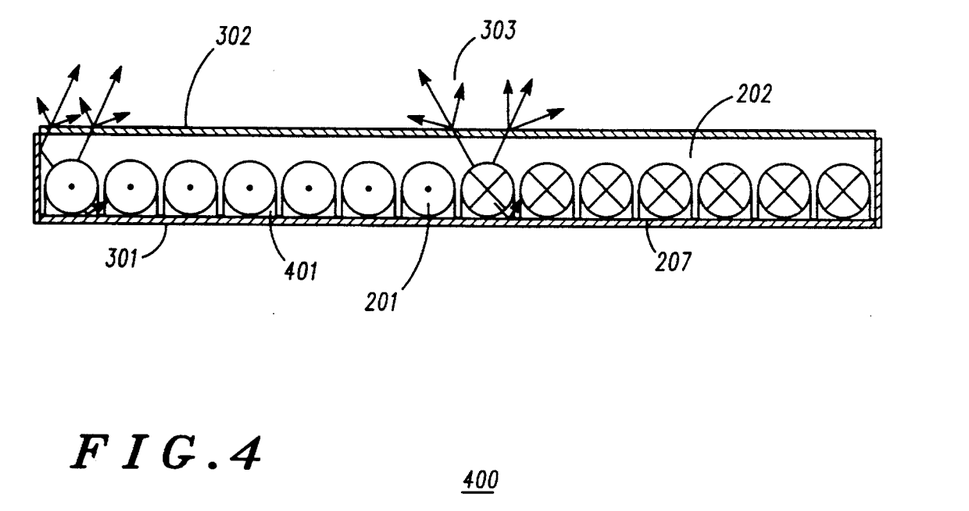
FIG. 4 illustrates an alternate cross-sectional view of the optical fiber light emitting apparatus of FIG. 2 in accordance with the present invention.

FIG. 4 illustrates an alternate cross-sectional view of the optical fiber light emitting apparatus 200 of FIG. 2 in accordance with an alternate embodiment of the present invention. The carrier 202 includes channels 401 formed in the bottom side 207. The optical fiber 201 is held in the channel 401 with the reflector 301 by attaching the reflector 401 to the bottom side 207 of the carrier 202. The channels 401 advantageously permit the optical fiber to be assembled with the carrier after the carder is formed.

Figure 5:
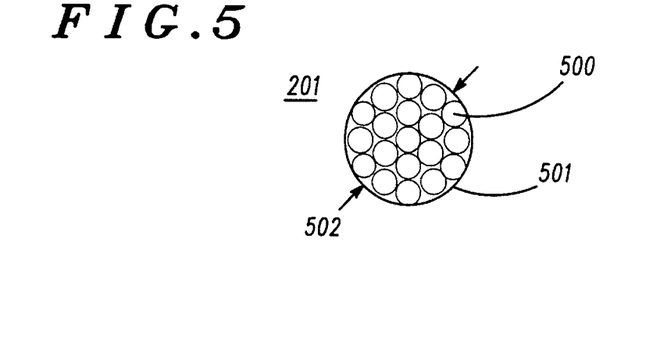
FIG. 5 illustrates a cross-sectional view of plurality of optical fiber strands forming the optical fiber of FIG. 2 in accordance with the present invention.

FIG. 5 illustrates a cross-sectional view of plurality of optical fiber strands 500 forming the optical fiber 201 of FIG. 2 in accordance with the present invention.

The optical fiber 201 alternatively comprises the plurality of optical fiber strands 500 bundled together. The plurality of smaller optical fiber strands 500 can advantageously be bent at a sharper radius than a single optical fiber of essentially the same diameter.

A technique for bundling the optical fiber strands 500 for coupling to the light source is well known in the art which uses a connector assembly consisting of a buffer material (not shown) surrounding the gathered optical fiber strands 500 and a ferrule (not shown) crimped onto the buffer material to tightly bundle the ends together. The diameter 502 of the optical fiber strands 500 forming a tight bundle is calculated using the following equation:

$$d_{bundle} = d_{one\ optical\ strand} \left( \sqrt{n} + \frac{\sqrt{n \times 40}}{100} \right)$$

wherein n=the number of optical fiber strands. For example, 120 optical fiber strands 500 having a diameter of 0.25 mm each produces a 3.83 mm diameter bundle 502.

The ends of the optical fiber strands 500 when bundled, are cut and polished at their end surface and held on a plane essentially perpendicular to the principal axis of the light source to properly receive light from the light source and to transmit the maximum amount of light through the surface and down the length of the optical fiber for illuminating the predetermined area 206.

A cover 501 made of substantially translucent material is optional but preferably used to surround the optical fiber strands 500 for organizing the optical fiber strands 500. The cover 501 may extend along substantially the entire length of the optical fiber 201 or be discretely spaced bands. Alternatively, the optical fiber strands 500 may be twisted together.

Figure 6:
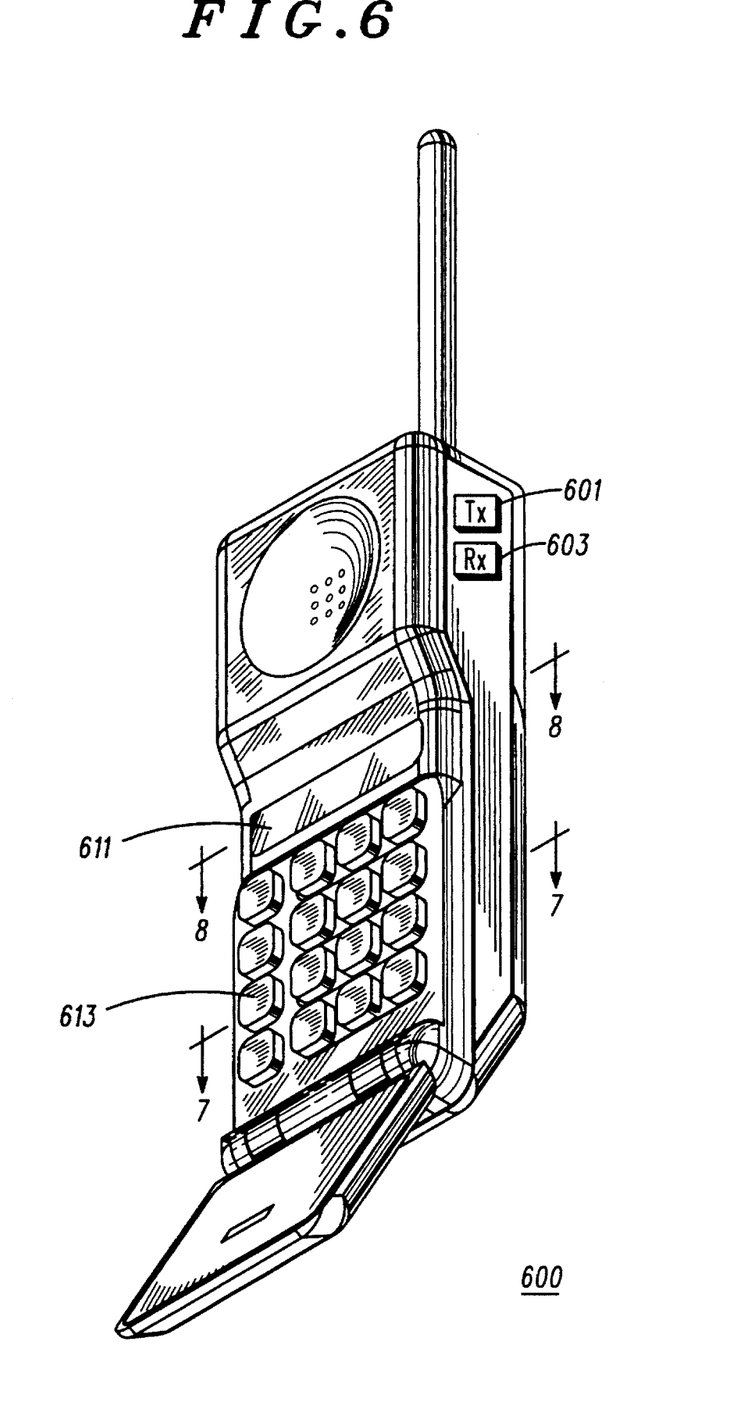
FIG. 6 illustrates an electronic device including a keypad and a display in accordance with the present invention.

FIG. 6 illustrates an electronic device 600 including a keypad 613 and a display 611 in accordance with the present invention. In particular, the electronic device 600 is a particular type of communication unit known as a portable radio telephone. The individual elements of the electronic device 600 represented as a communication unit, having a keypad 613 and display 611 are well known in the art and no further discussion will be presented except to facilitate the understanding of the present invention. Examples of communication units include mobile and portable radio telephones, pagers, pocket notebooks, portable control panels, user interface devices.

The electronic device 600 representing a communication unit generally includes at least one of a transmitter 601, a receiver 603, and a transceiver 601, 603 (internal to the device). The receiver 603 receives signals representing received information. A display has information positions for presenting the received information substantially throughout a first predetermined area (typically, within the display lens area). The transmitter 601 transmits signals representing transmitted information. A plurality of keys forming the keypad 613 are positioned substantially throughout a second predetermined area (typically, the keypad area) for inputting the transmitted information. In accordance with the present invention, at least one optical fiber is arranged in a repeating, recurrent pattern extending substantially throughout at least one of the first and second predetermined areas. The at least one optical fiber has a plurality of locations along the length thereof permitting light entering at least a first end of the at least one optical fiber for transmission therein to be selectively emitted by the at least one optical fiber at the plurality of locations for producing substantially uniform illumination for at least one of the information positions and plurality of keys positioned substantially throughout the first and second predetermined areas, respectively.

Figure 7:
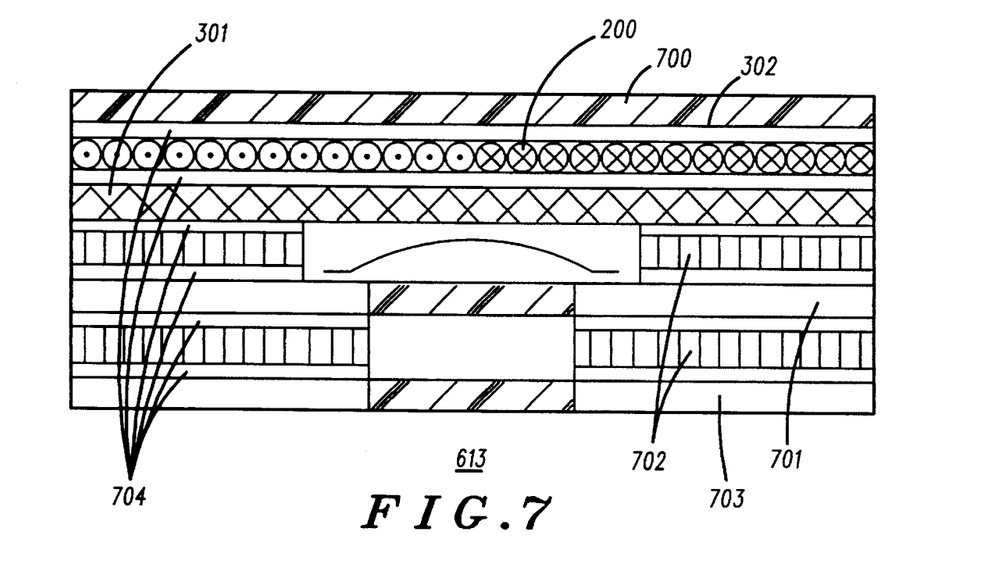
FIG. 7 illustrates a cross-sectional view of the keypad of FIG. 6 incorporating the optical fiber light emitting apparatus of FIG. 2 in accordance with the present invention.

FIG. 7 illustrates a cross-sectional view of the keypad 613 of FIG. 6 incorporating the optical fiber light emitting apparatus 200 of FIG. 2 in accordance with the present invention. The keypad 613 generally comprises the optical fiber light emitting apparatus 200, a membrane 700 (with the diffuser 302), the reflector 301, the top and bottom switch layers 701 and 703, the spacers 702 and the adhesive 704. The keypad construction incorporating the novel optical fiber light emitting apparatus 200 is well known in the art and no further discussion will be given.

Figure 8:
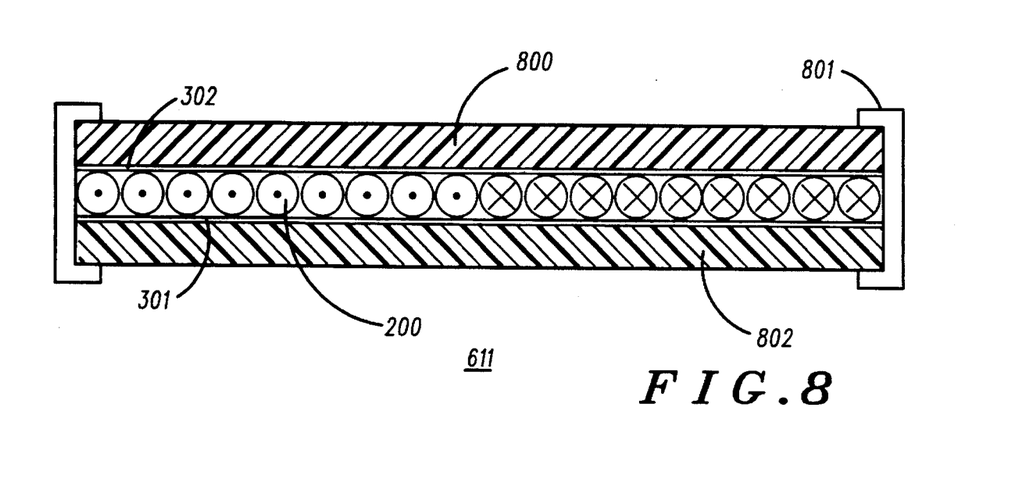
FIG. 8 illustrates a cross-sectional view of the display of FIG. 6 incorporating the optical fiber light emitting apparatus of FIG. 2 in accordance with the present invention.

FIG. 8 illustrates a cross-sectional view of the display 611 of FIG. 6 incorporating the optical fiber light emitting apparatus 200 of FIG. 2 in accordance with the present invention. The display 611, represented a liquid crystal display (LCD), generally comprises LCD glass 800, a bezel 801, a circuit board 802, the diffuser 302, the reflector 301 and the optical fiber light emitting apparatus 200. The display construction incorporating the novel optical fiber light emitting apparatus 200 is well known in the art and no further discussion will be given.

Figure 9:
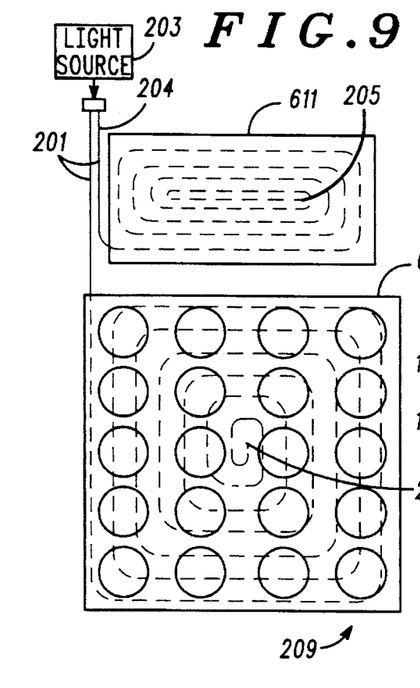
FIG. 9 illustrates a first schematic view of the display and the keypad of FIG. 6 incorporating the optical fiber light emitting apparatus of FIG. 2 in accordance with the present invention.

FIG. 9 illustrates a first schematic view of the display 611 and the keypad 613 of FIG. 6 incorporating the optical fiber light emitting apparatus 200 of FIG. 2 in accordance with the present invention. The display 611 and the keypad 613 each have the optical fiber 201 arranged in a spiral pattern 209. The optical fibers for the display 611 and the keypad 613 advantageously received light at a first end 204 from the same light source 203. The second end 205 of the optical fibers are cut, polished and have a reflector to keep the light reaching the second end 205 inside the optical fiber.

Figure 10:
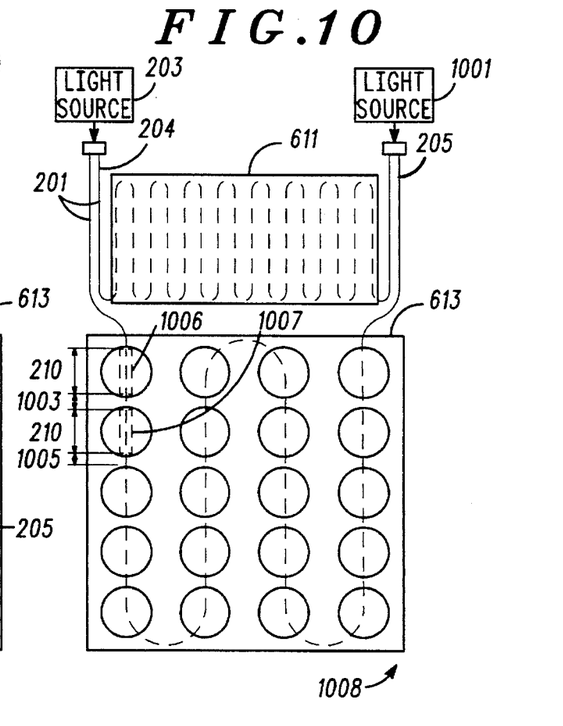
FIG. 10 illustrates a second schematic view of the display and the keypad of FIG. 6 incorporating the optical fiber light emitting apparatus of FIG. 2 in accordance with the present invention.

FIG. 10 illustrates a second schematic view of the display 611 and the keypad 613 of FIG. 6 incorporating the optical fiber light emitting apparatus 200 of FIG. 2 in accordance with the present invention. The display 611 and the keypad 613 each have the optical fiber 201 arranged in a serpentine pattern 1008. The optical fiber 201 for each of the display 611 and the keypad 613 advantageously receive light at a first end 204 from the same light source 203 and receives light at a second end 205 from another light source 1001.

The repeating, recurrent serpentine pattern is advantageously is disposed substantially beneath the keys. Therefore, the optical fiber 201 emits light at the plurality of locations 210 when beneath the keys (1006 and 1007, for example) to only emit light where its needed.

Figure 11:
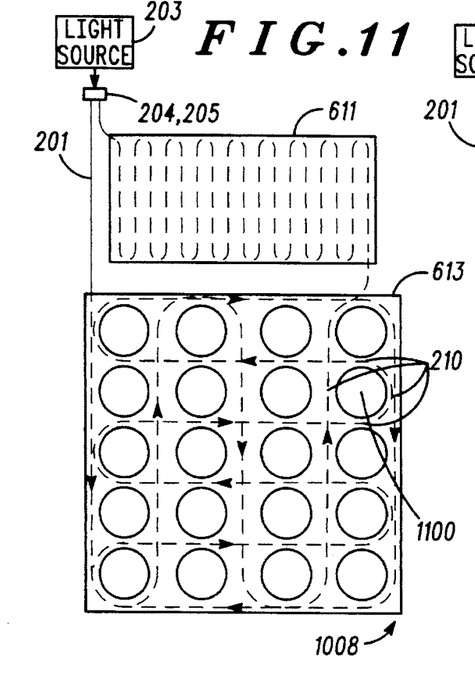
FIG. 11 illustrates a third schematic view of the display and the keypad of FIG, 6 incorporating the optical fiber light emitting apparatus of FIG. 2 in accordance with the present invention.

FIG. 11 illustrates a third schematic view of the display 611 and the keypad 613 of FIG. 6 incorporating the optical fiber light emitting apparatus 200 of FIG. 2 in accordance with the present invention. The display 611 and the keypad 613 use the same the optical fiber 201 arranged in a serpentine pattern 1008. Both the first and the second ends 204 and 205 of the optical fiber 201 advantageously receive light from the same light source 203. The plurality of locations 210 along the optical fiber 201 that emit light from the optical fiber 201 correspond to the position of the keys (1100, for example) such that each key is surrounded by light emitted by the locations 210 along the optical fiber 201.

Figure 12:
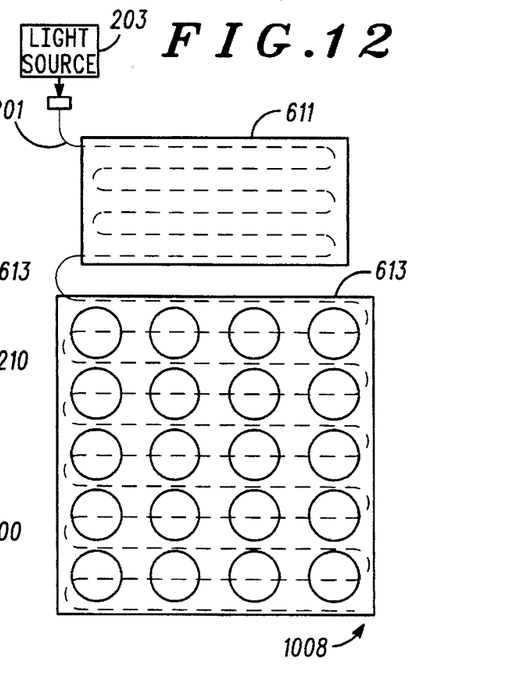
FIG. 12 illustrates a fourth schematic view of the display and the keypad of FIG, 6 incorporating the optical fiber light emitting apparatus of FIG, 2 in accordance with the present invention.

FIG. 12 illustrates a fourth schematic view of the display 611 and the keypad 613 of FIG. 6 incorporating the optical fiber light emitting apparatus 200 of FIG. 2 in accordance with the present invention. The display 611 and the keypad 613 use the same the optical fiber 201 arranged in a serpentine pattern 1008. Only the first end 204 of the optical fiber 201 receives light from the light source 203. The plurality of locations 210 along the optical fiber 201 that emit light from the optical fiber 201 are disposed both between and beneath the keys to advantageously illuminate the entire keypad area. FIGS. 2–4 and FIGS. 7–12 show the pattern of the optical fiber 201 arranged to be substantially parallel to the predetermined area. The optical fiber 201 has a plurality of bends being substantially parallel to a plane of illumination of the predetermined area.

The present invention provides an optical fiber light emitting apparatus 200 suitable where limited space is available. The optical light emitting apparatus 200 has at least one optical fiber 201 arranged in a repeating, recurrent pattern extending substantially throughout a predetermined area 206. The optic fiber 201 has a plurality of locations 210 along the length thereof permitting light entering at least a first end 204 of the at least one optical fiber 201 for transmission therein to be selectively emitted by the at least one optical fiber 201 at the plurality of locations 210 for producing substantially uniform illumination substantially throughout the predetermined area 206. For example, the continuous nonlinear pattern may be arranged to form a spiral 209 or serpentine 1008 pattern. The repeating, recurrent pattern eliminates the space required for the fan-in arrangement of the prior art optical fiber light emitting panels. The optical fiber light emitting apparatus 200 is beneficial for illuminating keypads 613 and displays 611 in electronic devices 600, such as portable radiotelephones, having limited space available.

I claim:

1. An optical fiber light emitting apparatus comprising:
    at least one optical fiber arranged in a continuous, nonlinear pattern along a common path so that the at least one optical fiber extends substantially throughout a predetermined area, the pattern arranged to be substantially parallel to the predetermined area, the at least one optical fiber having a plurality of locations along the length thereof permitting light entering at least a first end of the at least one optical fiber for transmission therein to be selectively emitted by the at least one optical fiber at the plurality of locations for producing substantially uniform illumination substantially throughout the predetermined area.

2. An optical fiber light emitting apparatus according to claim 1 further comprising a carrier forming a support for holding the at least one optical fiber in the continuous, nonlinear pattern.

3. An optical fiber light emitting apparatus according to claim 1 wherein the continuous, nonlinear pattern is a spiral pattern.

4. An optical fiber light emitting apparatus according to claim 1 wherein the continuous, nonlinear pattern is a serpentine pattern.

5. An optical fiber light emitting apparatus according to claim 1 wherein the at least one optical fiber further comprises a plurality of optical fiber strands bundled together.

6. An optical fiber light emitting apparatus according to claim 1 further comprising a reflector for redirecting at least a portion of the light emitted by the plurality of locations.

7. An optical fiber light emitting apparatus according to claim 1 further comprising a diffuser for diffusing at least a portion of the light emitted by the plurality of locations.

8. An optical fiber light emitting apparatus according to claim 1 further comprising a light source for transmitting light into the first end of the at least one optical fiber.

9. A keypad comprising:
    a plurality of keys positioned substantially throughout a predetermined area;
    at least one optical fiber arranged in a repeating, recurrent pattern so that the at least one optical fiber extends substantially throughout the predetermined area, the pattern arranged to be substantially parallel to the predetermined area, the at least one optical fiber having a plurality of locations along the length thereof permitting light entering at least a first end of the at least one optical fiber for transmission therein to be selectively emitted by the at least one optical fiber at the plurality of locations for producing substantially uniform illumination for the plurality of keys positioned substantially throughout the predetermined area;
    a reflector for redirecting at least a portion of the light emitted by the plurality of locations; and
    a diffuser for diffusing at least a portion of the light emitted by the plurality of locations.

10. A keypad according to claim 9 wherein the repeating, recurrent pattern is disposed substantially between the keys.

11. A keypad according to claim 9 wherein repeating, recurrent pattern is disposed substantially beneath the keys.

12. A keypad according to claim 9 wherein the plurality of locations correspond to the position of the keys.

13. A display comprising:
    positions for information to be presented substantially throughout a predetermined area;
    at least one optical fiber arranged in a repeating, recurrent pattern so that the at least one optical fiber extends substantially throughout the predetermined area, the pattern arranged to be substantially parallel to .the predetermined area, the at least one optical fiber having a plurality of locations along the length thereof permitting light entering at least a first end of the at least one optical fiber for transmission therein to be selectively emitted by the at least one optical fiber at the plurality of locations for producing substantially uniform illumination for the positions for information substantially throughout the predetermined area;
    a reflector for redirecting at least a portion of the light emitted by the plurality of locations; and
    a diffuser for diffusing at least a portion of the light emitted by the plurality of locations.

14. A display according to claim 13 wherein the plurality of locations correspond to the positions for the information.

15. An electronic device comprising:

a display having positions for presenting information substantially throughout a first predetermined area;

a keypad having a plurality of keys positioned substantially throughout a second predetermined area; and at least one optical fiber arranged in a repeating, recurrent pattern so that the at least one optical fiber extends substantially throughout at least one of the first and second predetermined areas, the pattern arranged to be substantially parallel to the at least one of the first and second predetermined areas, the at least one optical fiber having a plurality of locations along the length thereof permitting light entering at least a first end of the at least one optical fiber for transmission therein to be selectively emitted by the at least one optical fiber at the plurality of locations for producing substantially uniform illumination for at least one of the positions for presenting the information and the plurality of keys positioned substantially throughout the first and second predetermined areas, respectively.

16. A communication unit comprising:

a receiver for receiving signals representing information;

a display having information positions for presenting the information substantially throughout a predetermined area; and at least one optical fiber arranged in a repeating, recurrent pattern so that the at least one optical fiber extends substantially throughout the predetermined area, the pattern arranged to be substantially parallel to the predetermined area, the at least one optical fiber having a plurality of locations along the length thereof permitting light entering at least a first end of the at least one optical fiber for transmission therein to be selectively emitted by the at least one optical fiber at the plurality of locations for producing substantially uniform illumination for the information positions substantially throughout the predetermined area.

17. A communication unit comprising:

a transmitter for transmitting signals representing information;

a plurality of keys positioned substantially throughout a predetermined area for inputting the information; and at least one optical fiber arranged in a repeating, recurrent pattern so that the at least one optical fiber extends substantially throughout the predetermined area, the pattern arranged to be substantially parallel to the predetermined area, the at least one optical fiber having a plurality of locations along the length thereof permitting light entering at least a first end of the at least one optical fiber for transmission therein to be selectively emitted by the at least one optical fiber at the plurality of locations for producing substantially uniform illumination for the plurality of keys positioned substantially throughout the predetermined area.

18. A communication unit comprising:

a receiver for receiving signals representing received information;

a display having information positions for presenting the received information substantially throughout a first predetermined area;

a transmitter for transmitting signals representing transmitted information;

a plurality of keys positioned substantially throughout a second predetermined area for inputting the transmitted information; and at least one optical fiber arranged in a repeating, recurrent pattern so that the at least one optical fiber extends substantially throughout at least one of the first and second predetermined areas, the pattern arranged to be substantially parallel to the at least one of the first and second predetermined areas, the at least one optical fiber having a plurality of locations along the length thereof permitting light entering at least a first end of the at least one optical fiber for transmission therein to be selectively emitted by the at least one optical fiber at the plurality of locations for producing substantially uniform illumination for at least one of the information positions and plurality of keys positioned substantially throughout the first and second predetermined areas, respectively.

19. An optical fiber light emitting apparatus comprising:

at least one optical fiber for transmitting light therein, the at least one optical fiber having at least one light receiving input for receiving the light from a light source, the at least one optical fiber having a plurality of light emitting outputs for selectively emitting the light transmitted within the at least one optical fiber, the at least one optical fiber arranged in a continuous, nonlinear pattern along a common path so that the at least one optical fiber extends substantially throughout a predetermined area to provide substantially uniform illumination of the predetermined area, the at least one optical fiber having a plurality of bends being substantially parallel to a plane of illumination of the predetermined area.

20. An optical fiber light emitting apparatus according to claim 19 wherein the pattern formed by the arrangement of the at least one optical fiber is a repeating recurrent pattern.

21. An optical fiber light emitting apparatus according to claim 19 wherein the pattern formed by the arrangement of the at least one optical fiber is a spiral pattern.

22. An optical fiber light emitting apparatus according to claim 19 wherein the pattern formed by the arrangement of the at least one optical fiber is a serpentine pattern.

23. An optical fiber light emitting apparatus comprising:

only one optical fiber for transmitting light therein, the only one optical fiber having a light receiving input for receiving the light from a light source, the only one optical fiber having a plurality of light emitting outputs for selectively emitting the light transmitted within the only one optical fiber, the only one optical fiber arranged in a continuous, nonlinear pattern along a common path so that the only one optical fiber extends substantially throughout a predetermined area substantially parallel to the pattern to provide substantially uniform illumination of the predetermined area.

24. An optical fiber light emitting apparatus according to claim 23 wherein the pattern formed by the arrangement of the one optical fiber further comprises a plurality of bends being substantially parallel to the plane of illumination of the predetermined area.

25. An optical fiber light emitting apparatus according to claim 23 wherein the pattern formed by the arrangement of the one optical fiber is a repeating recurrent pattern.

26. An optical fiber light emitting apparatus according to claim 23 wherein the pattern formed by the arrangement of the one optical fiber is a spiral pattern.

27. An optical fiber light emitting apparatus according to claim 23 wherein the pattern formed by the arrangement of the one optical fiber is a serpentine pattern.

28. An optical fiber light emitting apparatus comprising:

at least one optical fiber arranged in a continuous, nonlinear pattern along a common path, repeatedly turning back in a direction essentially opposite to a former course, so that the at least one optical fiber extends substantially throughout a predetermined area, the pattern arranged to be substantially parallel to the predetermined area, the at least one optical fiber having a plurality of locations along the length thereof permitting light, entering at least a first end of the at least one optical fiber for transmission therein, to be selectively emitted by the at least one optical fiber at the plurality of locations for producing substantially uniform illumination substantially throughout the predetermined area.

* * * * *